(12) United States Patent
Sohmer

(10) Patent No.: US 11,772,662 B1
(45) Date of Patent: Oct. 3, 2023

(54) DYNAMIC MASS ESTIMATION FOR TWO AND THREE WHEELED VEHICLES

(71) Applicant: Robert Bosch GmbH, Stuttgart (DE)

(72) Inventor: Nicholas Sohmer, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/840,901

(22) Filed: Jun. 15, 2022

(51) Int. Cl.
*B60W 40/13* (2012.01)
*B62J 45/414* (2020.01)
*B62J 45/411* (2020.01)

(52) U.S. Cl.
CPC .......... *B60W 40/13* (2013.01); *B62J 45/411* (2020.02); *B62J 45/414* (2020.02)

(58) Field of Classification Search
CPC ....... B60W 40/13; B62J 45/411; B62J 45/414
See application file for complete search history.

(56) References Cited

U.S. PATENT DOCUMENTS

| | | | |
|---|---|---|---|
| 8,170,765 B2 | 5/2012 | Woywod et al. | |
| 8,200,405 B2 | 6/2012 | Cress et al. | |
| 9,809,222 B2 | 11/2017 | Kaneta et al. | |
| 10,906,541 B2 | 2/2021 | Alpman et al. | |
| 2014/0277867 A1* | 9/2014 | Nedorezov | B60W 40/13 903/930 |
| 2019/0152453 A1* | 5/2019 | Tober | B60T 8/172 |

FOREIGN PATENT DOCUMENTS

DE 102008026531 A1 2/2009
EP 2032404 B1 1/2014

* cited by examiner

*Primary Examiner* — Tan Q Nguyen
(74) *Attorney, Agent, or Firm* — Michael Best & Friedrich LLP

(57) ABSTRACT

A control system for a vehicle including a first sensor that senses an acceleration of the vehicle and an electronic processor connected to the first sensor. The electronic processor determines whether a loading condition of the vehicle is detected and determines a first total mass of the vehicle using a first technique when the loading condition of the vehicle is detected. The electronic processor receives a first signal indicative of the acceleration of the vehicle from the first sensor, determines whether the acceleration of the vehicle is greater than zero, determines a second total mass of the vehicle using a second technique when the acceleration of the vehicle is greater than zero, determines a third total mass of the vehicle using a third technique when the acceleration of the vehicle is not greater than zero, and controls a function of the vehicle based on one of the total masses.

20 Claims, 6 Drawing Sheets

DYNAMIC MASS ESTIMATION FOR TWO AND THREE WHEELED VEHICLES

FIELD

This present disclosure relates to dynamic mass estimation for two and three wheeled vehicles.

BACKGROUND

The performance of active safety functions for two and three wheeled vehicles (e.g., anti-lock brake control, traction control, etc.) can be highly dependent on changes in the total mass of the vehicle. These changes in the total vehicle mass may negatively impact the performance of the active safety functions due to changes in the normal forces at the tire contact patches, weight transfer during braking or accelerating, and other vehicle dynamics behaviors.

SUMMARY

Aspects of the present disclosure are directed to systems and methods for determining the total mass of a vehicle.

One example provides a control system for a vehicle including a first sensor configured to sense an acceleration of the vehicle, a second sensor configured to sense a torque output of the vehicle, and an electronic processor connected to the first and second sensors. The electronic processor is configured to determine whether a loading condition of the vehicle is detected, determine a first total mass of the vehicle based on the loading condition of the vehicle when the loading condition of the vehicle is detected, and control a function of the vehicle based on the first total mass of the vehicle when the loading condition of the vehicle is detected. The electronic processor is further configured to receive a first signal indicative of the acceleration of the vehicle from the first sensor, receive a second signal indicative of the torque output of the vehicle from the second sensor, determine a second total mass of the vehicle based on the acceleration of the vehicle and torque output of the vehicle, and control the function of the vehicle based on the second total mass of the vehicle when the loading condition of the vehicle is not detected.

Another example provides a method for determining a total mass of a vehicle that includes a first sensor configured to sense an acceleration of the vehicle, a second sensor configured to sense a torque output of the vehicle, and an electronic processor connected to the first and second sensors. The method includes determining, via the electronic processor, whether a loading condition of the vehicle is detected, determining, via the electronic processor, a first total mass of the vehicle based on the loading condition of the vehicle when the loading condition of the vehicle is detected, and controlling a function of the vehicle based on the first total mass of the vehicle when the loading condition of the vehicle is detected. The method further includes receiving, via the electronic processor, a first signal indicative of the acceleration of the vehicle from the first sensor, receiving, via the electronic processor, a second signal indicative of the torque output of the vehicle from the second sensor, determining, via the electronic processor, a second total mass of the vehicle based on the acceleration of the vehicle and torque output of the vehicle, and controlling, via the electronic processor, the function of the vehicle based on the second total mass of the vehicle when the loading condition of the vehicle is not detected.

Another example provides a control system for a vehicle including a first sensor configured to sense an acceleration of the vehicle and an electronic processor connected to the first sensor. The electronic processor is configured to determine whether a loading condition of the vehicle is detected, determine a first total mass of the vehicle using a first technique when the loading condition of the vehicle is detected, receive a first signal indicative of the acceleration of the vehicle from the first sensor, determine whether the acceleration of the vehicle is greater than zero, and determine a second total mass of the vehicle using a second technique when the acceleration of the vehicle is greater than zero. The electronic processor is further configured to determine a third total mass of the vehicle using a third technique when the acceleration of the vehicle is not greater than zero and control a function of the vehicle based on one of the first total mass of the vehicle, the second total mass of the vehicle, and the third total mass of the vehicle.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

Figure 1:
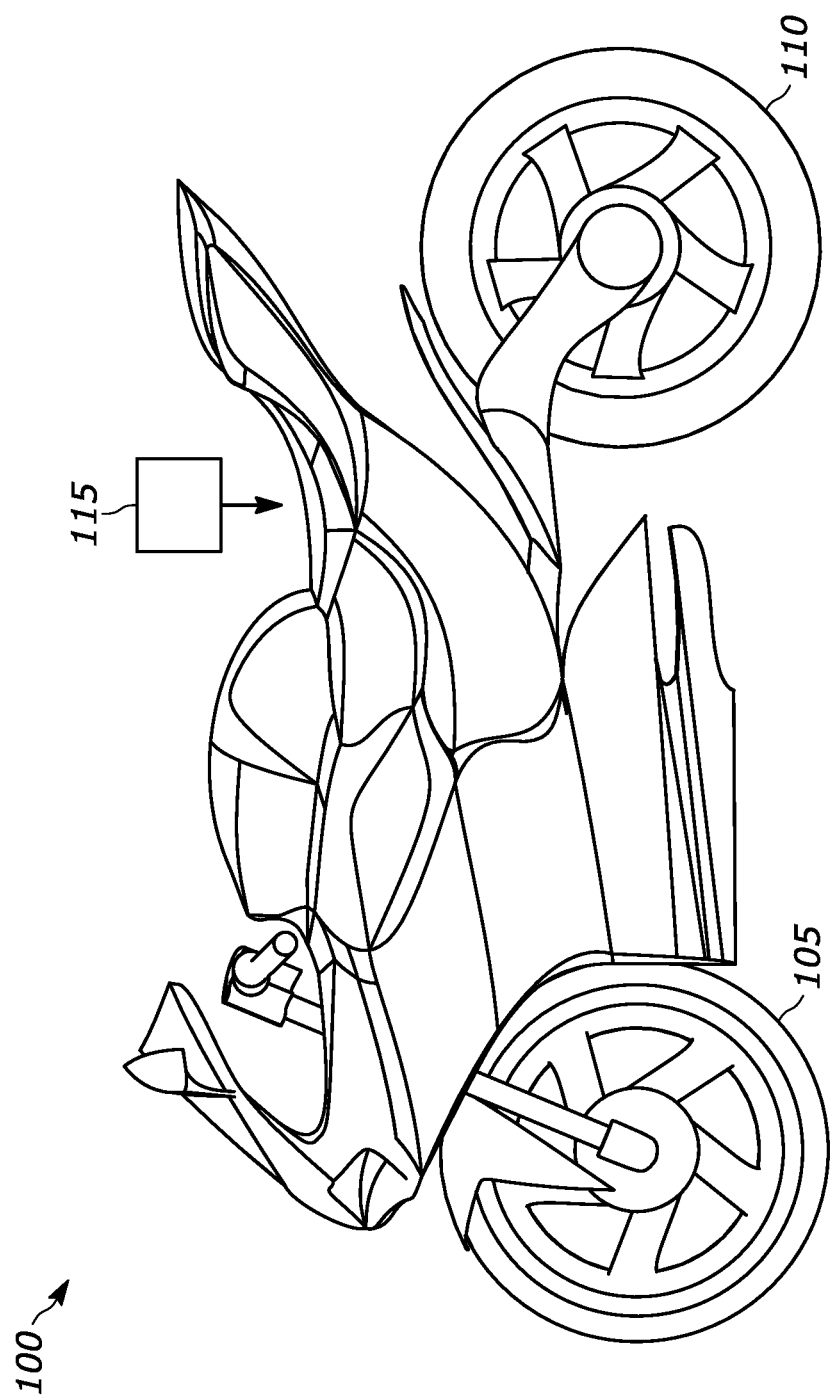
FIG. 1 is a perspective view of a vehicle, according to one example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects and examples.

The apparatus and method components have been represented where appropriate by conventional symbols in the drawings, showing only those specific details that are pertinent to understanding the examples, instances, and aspects illustrated so as not to obscure the disclosure with details that will be readily apparent to those of ordinary skill in the art having the benefit of the description herein.

DETAILED DESCRIPTION

One or more aspects are described and illustrated in the following description and accompanying drawings. These aspects are not limited to the specific details provided herein and may be modified in various ways. Furthermore, other aspects may exist that are not described herein. For example, a device or structure that is "configured" in a certain way is configured in at least that way but may also be configured in ways that are not listed. Furthermore, some aspects described herein may include one or more electronic processors configured to perform the described functionality by executing instructions stored in non-transitory, computer-readable medium. Similarly, aspects described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

FIG. 1 illustrates a perspective view of a vehicle 100 according to some aspects of the present disclosure. In the illustrated example, the vehicle 100 is a motorcycle that includes a first, or front, wheel 105 and a second, or rear, wheel 110. However, it should be understood that in some instances, the vehicle 100 is implemented as a different type of two-wheeled vehicle such as a scooter, an electric bicycle, or some other type of two-wheeled vehicle. Furthermore, it should be understood that in some instances, the vehicle 100 is implemented as a three-wheeled vehicle. In some instances, the vehicle 100 is powered by an internal combustion engine. In some instances, the vehicle 100 is an electric vehicle. In some instances, the vehicle 100 is a hybrid vehicle.

As will be described in more detail below, performance of one or more functions of the vehicle 100 may depend on the total mass of the vehicle 100. The total mass of the vehicle 100 is equal to the sum of the mass of the vehicle 100 and the mass of the load 115 supported by the vehicle 100. However, the total mass of the vehicle 100 is not a constant value, as the mass of the load 115 may change depending on a loading condition of the vehicle 100. For example, the total mass of the vehicle 100 may change depending on which one of the following loading conditions is present during operation of the vehicle 100: a single rider loading condition, a single rider with luggage loading condition, a double rider loading condition, and a double rider with luggage loading condition.

For the purposes of this disclosure, it will generally be assumed that the single rider loading condition is the loading condition with the least mass and that the double rider with luggage loading condition is the loading condition with the greatest mass. Moreover, it will generally be assumed that the single rider with luggage loading condition has a mass that is less than the mass of the double rider loading condition. However, it should be understood that the relative relationship between the respective masses of the different loading conditions is provided merely as an example and does not limit implementation of the vehicle 100 in any way. As an example, in some instances, the mass of the single rider loading condition may be greater than the respective masses of one or more of the other loading conditions. Furthermore, it should be understood that the four different vehicle loading conditions described herein are provided merely as an example and do not in any way limit the vehicle 100 from being operated under one or more additional loading conditions. For example, in some instances, the vehicle 100 may be operated under a loading condition that includes more than two riders.

Figure 2:
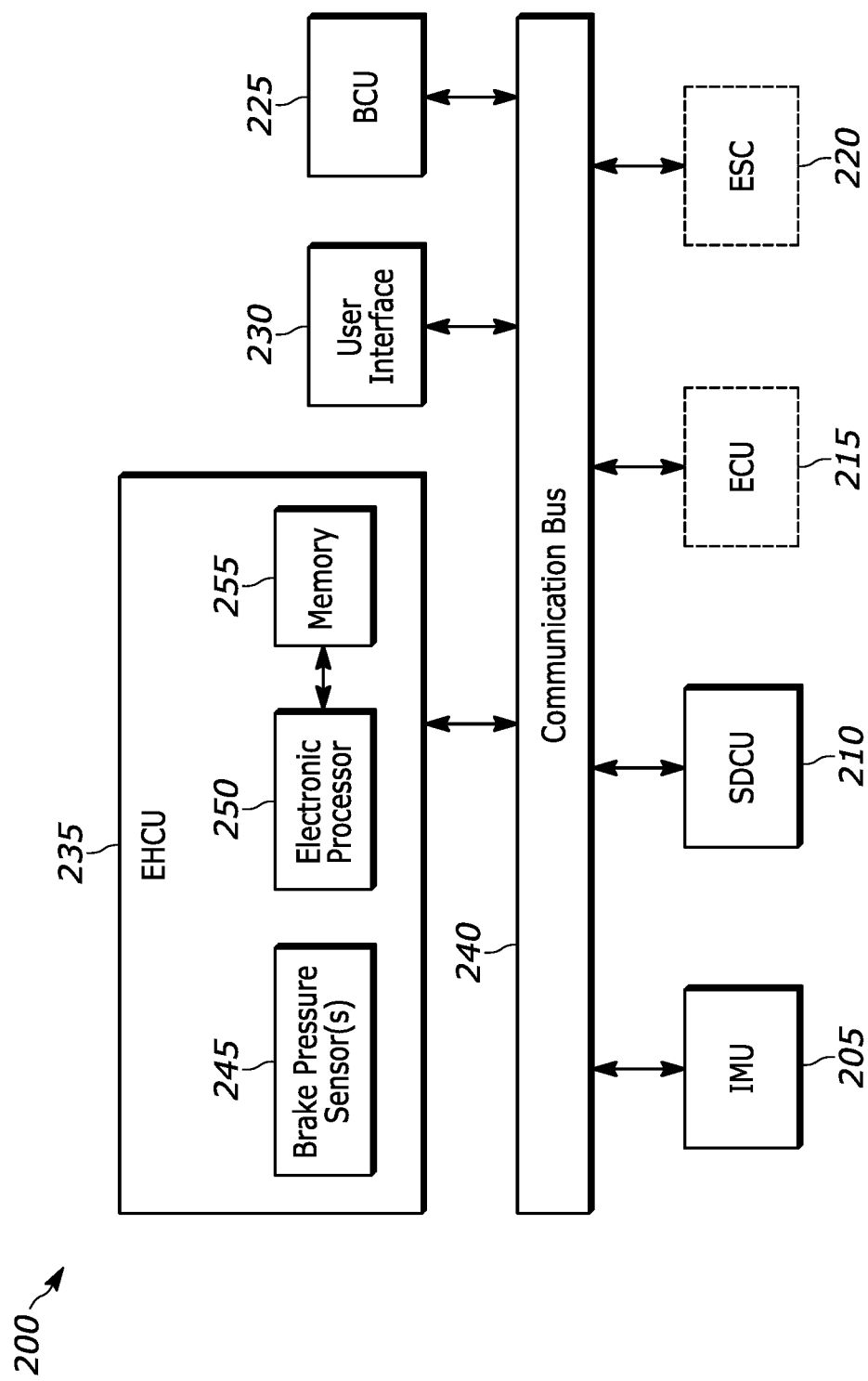
FIG. 2 is a block diagram of a control system for the vehicle of FIG. 1, according to one example.

FIG. 2 illustrates a block diagram of the control system 200 for the vehicle 100. As will be described in more detail below, one or more components included in the control system 200 are used for determining the total mass of the vehicle 100. In the illustrated example, the control system 200 includes an inertial measurement unit (IMU) 205, a semi-active damping control unit (SDCU) 210, an engine control unit (ECU) 215 and/or an electronic speed controller (ESC) 220, a body control unit (BCU) 225, a user interface 230, and an electro-hydraulic control unit (EHCU) 235. In some instances, the control system 200 includes either the ECU 215 or the ESC 220. For example, for instances in which the vehicle 100 is powered by an internal combustion engine, the control system 200 includes the ECU 215 and does not include the ESC 220. As another example, for instances in which the vehicle 100 is an electric vehicle, the control system 200 includes the ESC 220 and does not include the ECU 215. For instances in which the vehicle 100 is a hybrid vehicle, the control system 200 may include both the ECU 215 and the ESC 220.

Although illustrated as separate components, it should be understood that in some instances, one or more of the components included in the control system 200 are combined into a single component. As just one example, in some instances, the ECU 215 and the ESC 220 are implemented as a single component. Moreover, it should be understood that in some instances, some of the components included in the control system 200 are implemented as more than one component. For example, in some instances, the IMU 205 is implemented as more than one component.

The components included in the control system 200 are electrically and/or communicatively coupled to each other by a communication bus 240. In some instances, the communication bus 240 is implemented as a controller area network (CAN) bus. In some instances, the communication bus 240 is implemented as a FlexRay bus. In some instances, the communication bus 240 provides a different type of communication path, such as ethernet, between the components included in the control system 200.

The IMU 205 is configured to sense and determine information associated with motion and/or orientation of the vehicle 100. For example, the IMU 205 includes and/or is connected to one or more accelerometers and/or one or more gyroscopes that detect the longitudinal acceleration of the vehicle 100, the roll rate of the vehicle 100, the yaw rate of the vehicle 100, the pitch angle of the vehicle 100, the pitch rate of the vehicle 100, and other information associated with the motion and/or orientation of the vehicle 100. Based on the signals generated by the accelerometer(s) and/or the gyroscope(s), the IMU 205 determines the acceleration and/or orientation of the vehicle 100. For example, in some instances, the IMU 205 includes a microcontroller (not shown) that is configured to determine the acceleration and/or orientation of the vehicle 100 based on signals generated by the accelerometer(s) and/or the gyroscope(s). In other instances, a microcontroller located elsewhere within the control system 200 is configured to determine the acceleration and/or orientation of the vehicle 100 based on signals generated by the accelerometer(s) and/or the gyroscope(s).

The SDCU 210 is configured to control suspension mode of the vehicle 100 and/or determine a loading condition of the vehicle 100. For example, the SDCU 210 includes and/or is connected to one or more sensors, such as stroke and/or brake sensors, that detect conditions related to vehicle suspension and loading. Based on the signals generated by the sensors, the SDCU 210 determines whether the loading condition of the vehicle 100 is a single rider loading condition, a single rider with luggage loading condition, a dual rider loading condition, a dual rider with luggage loading condition, or some other loading condition. For example, in some instances, the SDCU 210 includes a microcontroller (not shown) that is configured to determine the loading condition of the vehicle 100 based on signals generated by the one or more sensors. In other instances, a microcontroller located elsewhere within the control system 200 is configured to determine the acceleration and/or orientation of the vehicle 100 based on signals generated by the stroke and/or pressure sensors.

In some instances, the SDCU 210 is configured to determine whether more or less vehicle damping is required based on signals generated by the one or more stroke sensors, signals indicative of a braking pressure applied to the vehicle 100 (e.g., signals generated by brake pressure sensors included in the EHCU 235), and/or signals related to vehicle pitch and/or longitudinal acceleration that are generated by the IMU 205. In such instances, the SDCU 210 determines an amount of weight transfer experienced by the vehicle 100 based on the above-described signals, and thus, determines the overall mass of the load 115 supported by the vehicle 100. Accordingly, in such instances, the SDCU 210 determines a loading condition of the vehicle 100 based on the determined load 115 supported by the vehicle 100. In other instances, the SDCU 210 may be configured by a user via an interface (e.g., the user interface 230) included on an instrument cluster of the vehicle 100. In such instances, a user is operable to change suspension damping of the vehicle 100 by selecting different modes such as soft/comfort mode, standard mode, sport mode, offroad mode, and etc.

When the vehicle 100 includes an internal combustion engine, the ECU 215 is configured to control operation of and detect one or more conditions associated with the internal combustion engine. For example, the ECU 215 includes and/or is connected to one or more sensors that detect the throttle position, the torque output of the engine, rotations per minute (RPM) of the engine, and/or fuel levels. The ECU 215 is configured to determine one or more of the throttle position, torque output of the engine, engine RPM, and/or fuel levels based on the signals generated by these sensors. For example, in some instances, the ECU 215 includes a microcontroller (not shown) that is configured to determine one or more of the throttle position, torque output, engine RPM, and/or fuel levels based on the signals generated by the sensors. In other instances, a microcontroller located elsewhere in the control system 200 is configured to determine one or more of the throttle position, torque output, engine RPM, and/or fuel levels based on the signals generated by the sensors.

When the vehicle 100 is an electric vehicle powered by an electric power source (e.g., a battery) and one or more motors, the ESC 220 is configured to control operation of and detect one or more conditions associated with the motor(s). For example, the ESC 220 includes and/or is connected to one or more sensors that the torque output of the motor(s), RPM of the motor(s), and/or battery capacity levels. The ESC 220 is configured to determine one or more of the torque output of the motor(s), RPM of the motor(s), level or generative brake performance, and/or battery capacity levels based on the signals generated by these sensors. For example, in some instances, the ESC 220 includes a microcontroller (not shown) that is configured to determine one or more of the torque output of the motor(s), RPM of the motor(s), level or generative brake performance, and/or battery capacity levels based on the signals generated by the sensors. In other instances, a microcontroller located elsewhere in the control system 200 is configured to determine one or more of the torque output of the motor(s), RPM of the motor(s), level or generative brake performance, and/or battery capacity levels based on the signals generated by the sensors. As described above, for instances in which the vehicle 100 is a hybrid vehicle, the control system 200 may include both the ECU 215 and the ESC 220.

The BCU 225 is configured to control and/or determine information associated with steering and tire pressure of the vehicle 100. For example, the BCU 225 includes and/or is connected to one or more steering angle sensors, one or more tire pressure sensor(s), and/or one or more additional sensors that detect steering angle and/or tire pressure. Based on the signals generated by the steering angle sensor(s), the tire pressure sensor(s), and/or other sensor(s), the BCU 225 determines the steering angle of the vehicle 100 and/or the pressure of the tires included in the vehicle 100. For example, in some instances, the BCU 225 includes a microcontroller (not shown) that is configured to determine steering angle of the vehicle 100 and/or the tire pressure of the vehicle 100 based on the signals generated by the steering angle sensor(s), the tire pressure sensor(s), and/or the other sensor(s). In other instances, a microcontroller located elsewhere in the control system 200 is configured to determine the steering angle of the vehicle 100 and/or the tire pressure of the vehicle 100 based on the signals generated by the steering angle sensor(s), the tire pressure sensor(s), and/or the other sensor(s).

The user interface 230 is configured to receive input from a user and/or output information associated with the vehicle 100 to the user. In some instances, the user interface 230 includes a display (for example, a primary display, a secondary display, etc.) and/or input devices (for example, touch-screen displays, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In some instances, the user interface 230 integrated as a component of the vehicle 100. In other instances, the user interface 230 is a component that is external to the vehicle 100, such as a smartphone, tablet, or other similar mobile computing device.

Figure 3:
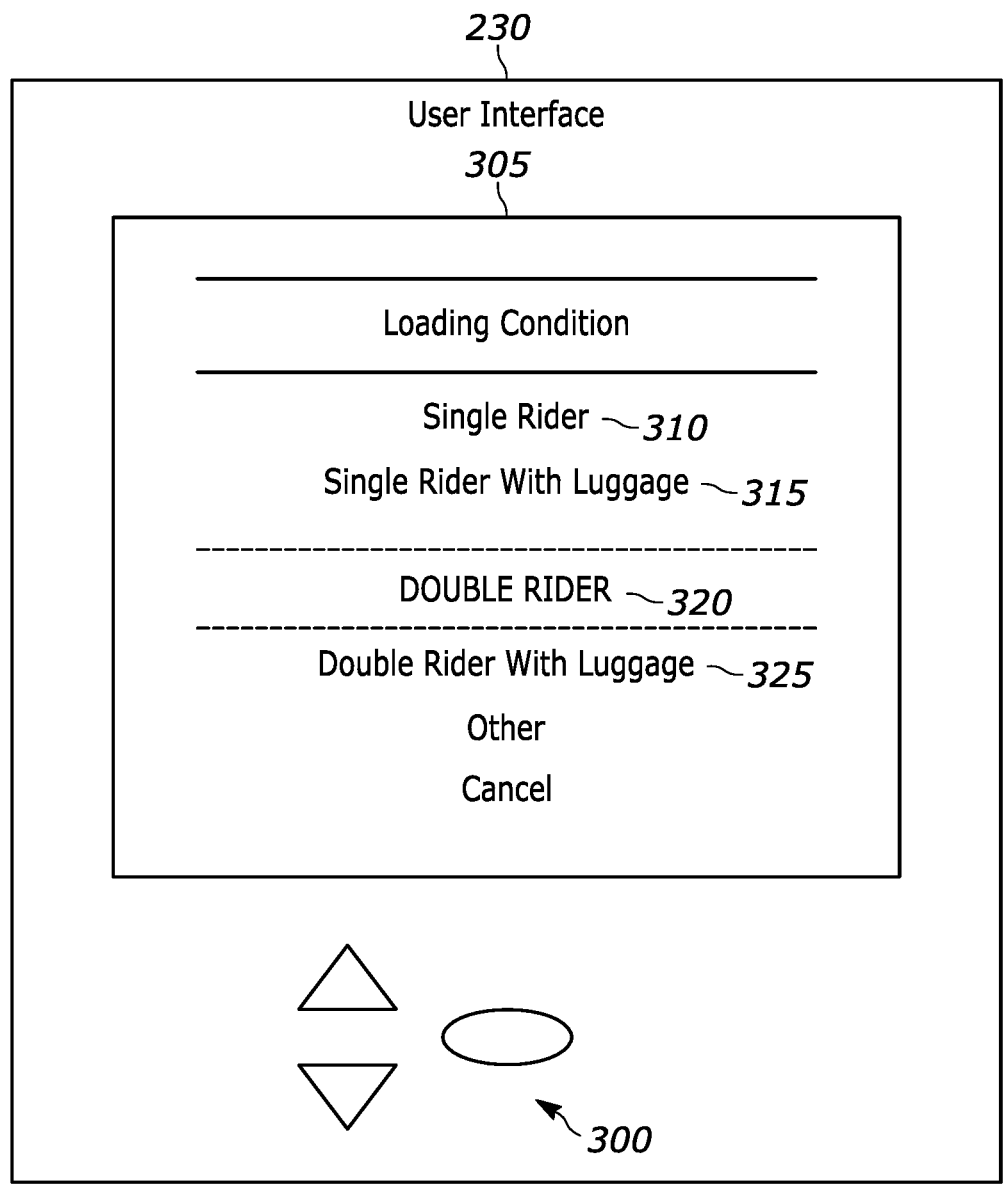
FIG. 3 illustrates a user interface for the vehicle of FIG. 1, according to one example.

In some instances, the user interface 230 is configured to receive a selection from a user. In such instances, a user selects a loading condition of the vehicle 100 using the input device(s) 300 (FIG. 3) included in the user interface 230. FIG. 3 illustrates an example user interface 230 that provides a list 305 of predefined loading conditions that may be selected by a user. As shown, the list 305 of predefined loading conditions includes a single rider loading condition 310, a single rider with luggage loading condition 315, a double rider loading condition 320, and a double rider with luggage loading condition 325. As described above, it should be understood that the list 305 of predefined loading conditions is provided as an example and does not in any way limit the vehicle 100 from being operated under additional loading conditions not described herein.

In some instances, the user interface 230 is configured to receive an input from a user that indicates the exact mass of the load 115 supported by the vehicle 100. For example, in such instances the user can provide, via the input devices 300, one or more numerical inputs that are indicative of the mass of the load 115 (e.g., the rider(s) and/or luggage) supported by the vehicle 100.

The EHCU 235 is configured to provide one or more safety and/or control functions, such as braking, anti-lock brake control, traction control, yaw stability control, rear wheel lift management, front wheel lift management, and others, for the vehicle 100. The performance of the safety and/or control functions provided by the EHCU 235 may change depending upon the total mass of the vehicle 100. Moreover, when an estimated total mass of the vehicle 100 is inaccurate, performance of the safety and/or control functions provided by the EHCU 235 suffers. Accordingly, as will be described in more detail below, the EHCU 235 is configured to dynamically estimate, or determine, the total mass of the vehicle 100 to account for changes in mass when the loading condition of the vehicle 100 changes. For example, the EHCU 235 determines the total mass of the vehicle 100 based on data provided by one or more of the IMU 205, the SDCU 210, the ECU 215, the ESC 220, the BCU 225, the user interface 230, and one or more additional sensors included in or otherwise coupled to the EHCU 235. In some instances, the EHCU 235 also includes and/or is connected to one or more pressure sensors 245 that sense a braking pressure applied to the vehicle. For example, the pressure sensor(s) 245 sense a braking pressure of the master cylinder brakes and/or wheel cylinder brakes included in the vehicle 100 and transmit signals indicative of the vehicle's 100 braking pressure to the EHCU 235.

As shown in FIG. 2, the EHCU 235 includes a plurality of electrical and electronic components that provide power, operational control, and protection to the components and modules within EHCU 235 and/or the control system 200. For example, the EHCU 235 includes an electronic processor 250 (for example, an application specific integrated circuit (ASIC), a programmable microprocessor, a microcontroller, programmable logic controller, or other suitable device) and a memory 255.

The memory 255 is a non-transitory computer readable medium that includes, for example, a program storage area and a data storage area. The program storage area and the data storage area can include combinations of different types of memory, for example one or more registers, read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In some instances, the data storage area of the memory 255 stores data associated with the mass of the vehicle 100, data associated with one or more predefined loading conditions of the vehicle 100, data associated with vehicle loading condition selections provided to the user interface 230, and/or other data associated with the vehicle 100.

The electronic processor 250 is connected to the memory 255 and executes software instructions that are capable of being stored in a RAM of the memory 255 (for example, during execution), a ROM of the memory 255 (for example, on a generally permanent basis), or another non-transitory computer-readable medium. In some instances, software used for estimating, or determining, the total mass of the vehicle 100 is stored in the memory 255. The software includes, for example, firmware, one or more applications, program data, filters, rules, one or more program modules, and other executable instructions. The electronic processor 250 is configured to retrieve from the memory 255 and execute, among other things, instructions related to the processes and methods that are used for determining the total mass of the vehicle 100. In another example, the electronic processor 250 is an ASIC that is configured to execute a logic function according to data stored in one or more registers of electronic processor 250. In some instances, the electronic processor 250 and/or the memory 255 are located elsewhere (e.g., outside of the EHCU 235) in the control system 200.

As described above, the EHCU 235 is configured to determine the total mass of the vehicle 100 based on data provided by one or more of the IMU 205, the SDCU 210, the ECU 215, the ESC 220, the BCU 225, the user interface 230, and/or one or more additional sensors included in or otherwise coupled to the EHCU 235. In some instances, the EHCU 235 is configured to used one or more methods for determining the total mass of the vehicle 100 based on data provided by one or more of the IMU 205, the SDCU 210, the ECU 215, the ESC 220, the BCU 225, the user interface 230, and/or one or more additional sensors included in or otherwise coupled to the EHCU 235. In such instances, the EHCU 235 may be use a particular method for determining the total mass of the vehicle 100 when other methods for determining the total mass of the vehicle 100 are unavailable.

The EHCU 235 is configured to determine a total mass of the vehicle 100 by using a first method, or technique, that is based on a detected, or determined, loading condition of the vehicle 100. The value of the total mass of the vehicle 100 that is determined using the first method may be referred to as "the first total mass" to distinguish from a total mass of the vehicle 100 that is determined using other methods. When using the first method to determine the total mass of the vehicle 100, the EHCU 235 receives data indicative of a loading condition of the vehicle 100 from the SDCU 210 and/or the user interface 230. For example, in some instances, the SDCU 210 is configured to determine the current loading condition (e.g., single rider, single rider with luggage, double rider, double rider with luggage, etc.) of the vehicle 100 based on signals generated by stroke sensors, brake pressure sensors, and/or accelerometers (e.g., accelerometers included in the IMU 205) as described above. After determining the current loading condition of the vehicle 100, the SDCU 210 transmits a signal indicative of the current loading condition of the vehicle 100 to the EHCU 235.

As another example, in some instances, the user interface 230 receives a selection for the current loading condition of the vehicle 100 and transmits a signal indicative of the selected loading condition of the vehicle 100 to the EHCU 235. For example, as described above with respect FIG. 3, the user selects, via the input device(s) 300, the current loading condition of the vehicle 100 (e.g., single rider, single rider with luggage, double rider, double rider with luggage, etc.) from the list 305 of predefined loading conditions.

The EHCU 235 determines the current loading condition of the vehicle 100 based on the signals received from the SDCU 210 and/or the user interface 230 and then determines the total mass of the vehicle 100 based on the current loading condition of the vehicle 100. In some instances, the EHCU 235 determines the total mass of the vehicle 100 to be the respective mass value that is stored in memory 255 in association with the current loading condition of the vehicle 100. That is, a respective mass value is stored in association with each respective loading condition of the vehicle 100 in the memory 255. In some instances, the respective mass values associated with the loading conditions of the vehicle 100 are predetermined, or factory set, values that are stored in the memory 255. In some instances, the respective mass values associated with the loading conditions of the vehicle 100 are configurable values that are provided and/or updated by the user. For example, the user can enter, via the user interface 230, the respective mass values to be stored in memory 255.

In some instances, a first mass value is stored in the memory 255 in association with the single rider loading condition such that the EHCU 235 determines the total mass of the vehicle 100 is equal to the first mass value when the current loading condition of the vehicle 100 is the single rider loading condition. Likewise, in some instances, a second mass value is stored in the memory 255 in association with the single rider with luggage loading condition such that the EHCU 235 determines the total mass of the vehicle 100 is equal to the second mass value when the current loading condition of the vehicle 100 is the single rider with luggage loading condition. Furthermore, in some instances, a third mass value is stored in the memory 255 in association with the double rider loading condition such that the EHCU 235 determines the total mass of the vehicle 100 is equal to the third mass value when the current loading condition of the vehicle 100 is the double rider loading condition. Moreover, in some instances, a fourth mass value is stored in the memory 255 in association with the double rider with luggage loading condition such that the EHCU 235 determines the total mass of the vehicle 100 is equal to the third mass value when the current loading condition of the vehicle 100 is the double rider with luggage loading condition.

As described above, the EHCU 235 is configured to control one or more safety functions of the vehicle 100 based on the first total mass of the vehicle 100 that is determined using the first method. For example, the EHCU 235 controls safety functions such as braking, anti-lock brake control, traction control, yaw stability control, rear wheel lift management, front wheel lift management, and others, based on the first total mass of the vehicle 100.

In some instances, the EHCU 235 uses the first method to determine the total mass of the vehicle 100 when the vehicle 100 is stationary or not accelerating. In some instances, the EHCU 235 uses the first method to determine the total mass of the vehicle 100 when the loading condition of the vehicle 100 is detected. However, in some instances, the current loading condition of the vehicle 100 is unavailable or cannot be detected. For example, when a user forgets to select, via the user interface 230, a current loading condition of the vehicle 100 and/or when the SDCU 210 is unable to determine the current loading condition of the vehicle 100, the current loading condition of the vehicle 100 is not detected by the EHCU 235. Moreover, in some situations SDCU 210 may not be present on the vehicle due to the vehicle's electrical architecture. Accordingly, in such instances, the EHCU 235 uses a different method for determining the total mass of the vehicle 100.

The EHCU 235 is further configured to determine a total mass of the vehicle 100 by using a second method, or technique, that is based on the torque output of the vehicle 100 and the longitudinal acceleration of the vehicle 100. The value of the total mass of the vehicle 100 that is determined using the second method may be referred to as "the second total mass" to distinguish from a total mass of the vehicle 100 that is determined using other methods. As described above, in some instances, the EHCU 235 receives data indicative of the longitudinal acceleration of the vehicle 100 from the IMU 205. For example, the IMU 205 includes and/or is connected to one or more accelerometers that sense the longitudinal acceleration of the vehicle 100. In other instances, the EHCU 235 determines the longitudinal acceleration of the vehicle 100 based on signals generated by an accelerometer included in or otherwise connected to the EHCU 235.

Furthermore, as described above, the EHCU 235 receives data indicative of the torque output of vehicle 100, such as one or more torque derivatives, from the ECU 215 and/or the ESC 220. For example, the ECU 215 transmits a signal indicative of torque output by the internal combustion engine to the EHCU 235 when the vehicle 100 includes an internal combustion engine. Similarly, the ESC 220 transmits a signal indicative of torque output by the motor(s) to the EHCU 235 when the vehicle 100 is an electric vehicle powered by one or more motors. In some instances, the ECU 215 and/or the ESC 220 transmit one or more signals indicative of derivatives of the torque output.

In some instances, the EHCU 235 determines the total mass of the vehicle 100 based on the relationship between the vehicle's 100 torque output, the vehicle's 100 acceleration, and the total mass of the vehicle 100. For example, the EHCU 235 uses Equation 1 to determine the total mass of the vehicle, where "$F_d$" is a force indicative of the torque output of the vehicle 100, "a" is the longitudinal acceleration of the vehicle 100, and "m" is the total mass of the vehicle 100.

$$m = F_d/a \quad \text{[Equation 1]}$$

In some instances, the EHCU 235 determines the total mass of the vehicle 100 by comparing the received acceleration and torque output data to empirical calibration data stored in the memory 255 of the EHCU 235. For example, in some instances, empirical calibration data indicative of the respective relationships between the longitudinal acceleration of the vehicle 100, the torque output of the vehicle 100, and the total mass of the vehicle 100 for a plurality of loading conditions of the vehicle 100 is stored in the memory 255. Accordingly, in such instances, the EHCU 235 determines that the total mass of the vehicle 100 is equal to the mass value that is stored in memory 255 in association with the current longitudinal acceleration and torque output of the vehicle 100. In some instances, the empirical calibration data is stored in memory 255 in the form of a look-up table.

Figure 4:
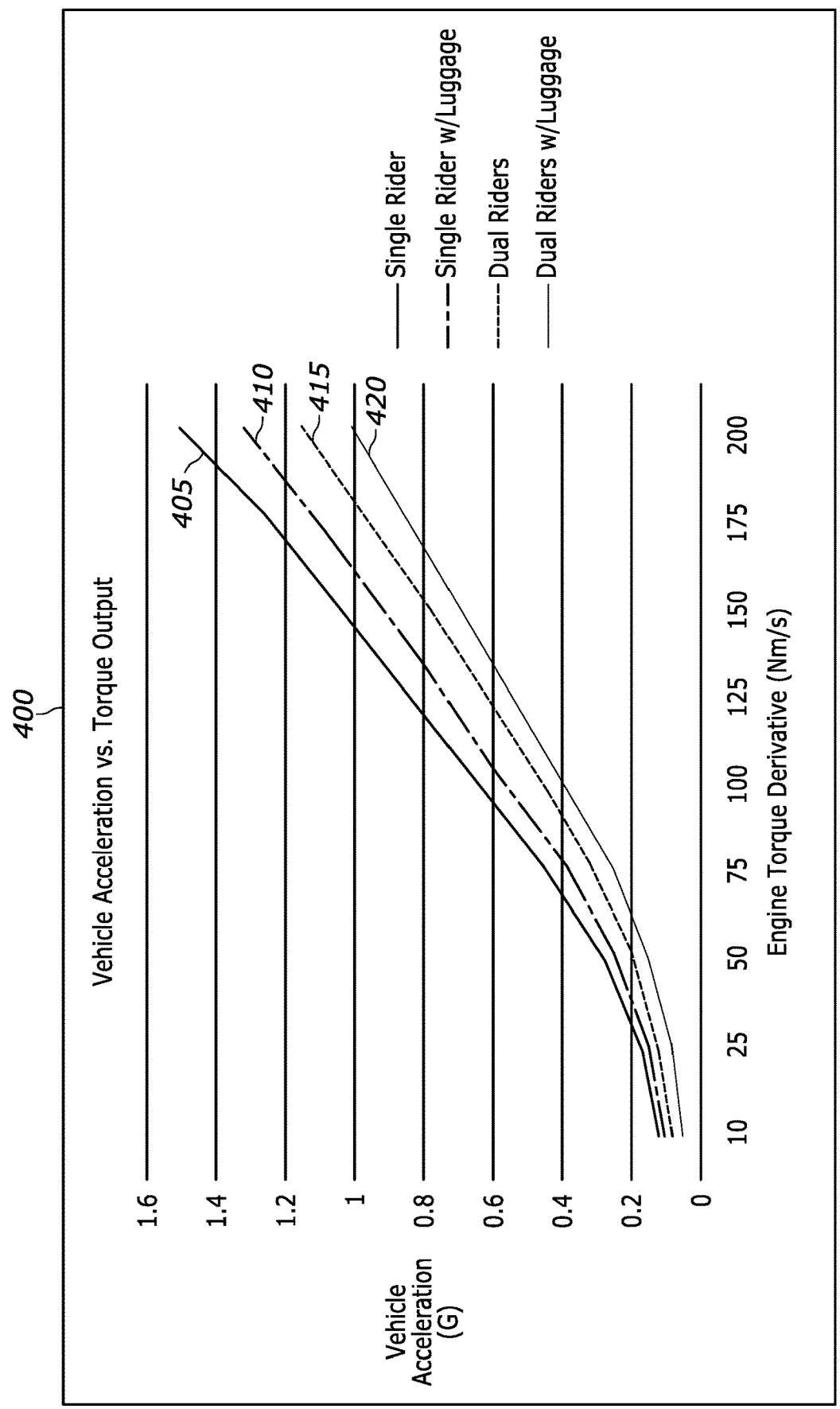
FIG. 4 is a graph illustrating the relationship between acceleration and torque output of a vehicle for a variety of vehicle loading conditions, according to one example.

In some instances, the empirical calibration data is stored in memory 255 in the form of curves, or graphs, that represent the relationship between the longitudinal acceleration of the vehicle 100 and the torque output of the vehicle 100 for a particular loading condition of the vehicle 100. FIG. 4 is a graph 400 illustrating the relationship between longitudinal acceleration of the vehicle 100 and the torque derivative(s) of an engine included in the vehicle 100 for a variety of vehicle loading conditions. For example, the graph 400 includes a first curve 405 that represents the relationship between acceleration and engine torque derivative for a single rider loading condition, a second curve 410 that represents the relationship between acceleration and engine torque derivative for a single rider with luggage loading condition, a third curve 415 that represents the relationship between acceleration and engine torque derivative for a double rider loading condition, and a fourth curve 420 that represents the relationship between acceleration and engine torque derivative for a double rider with luggage loading condition. In some instances, the EHCU 235 may use the graph 400 in combination with the current longitudinal acceleration and torque output of the vehicle 100 to determine a total mass of the vehicle 100.

As described above, the EHCU 235 is configured to control one or more safety functions of the vehicle 100 based on the second total mass of the vehicle 100 that is determined using the second method. For example, the EHCU 235 controls safety functions such as braking, anti-lock brake control, traction control, yaw stability control, rear wheel lift management, front wheel lift management, and others, based on the second total mass of the vehicle 100.

In some instances, the EHCU 235 uses the second method to determine the total mass of the vehicle 100 when the vehicle 100 is accelerating. In some instances, the EHCU 235 may use the second method to determine the total mass of the vehicle 100 when the acceleration of vehicle 100 is greater than zero (e.g., the vehicle 100 is not braking). However, in some instances the vehicle 100 is braking, and thus, the acceleration of the vehicle 100 is negative or zero. Accordingly, in such instances, the EHCU 235 uses a different method for determining the total mass of the vehicle 100.

The EHCU 235 is further configured to determine a total mass of the vehicle 100 by using a third method, or technique, that is based on the longitudinal acceleration of the vehicle 100 and the braking pressure applied to the vehicle 100. The value of the total mass of the vehicle 100 that is determined using the third method may be referred to as "the third total mass" to distinguish from a total mass of the vehicle 100 that is determined using other methods. As described above, the EHCU 235 determines the longitudinal acceleration of the vehicle 100 based on signals received from the IMU 205 and/or signals generated by an accelerometer included in or otherwise connected to the EHCU 235. For instances in which the vehicle 100 is braking, the longitudinal acceleration of the vehicle 100 may be referred to as a deceleration of the vehicle. Furthermore, as described above, in some instances the EHCU 235 receives data indicative of the brake pressure of the vehicle 100 from one or more pressure sensors 245.

In other instances, the EHCU 235 estimates the brake pressure of the vehicle 100 when data provided by the pressure sensor(s) 245 is unavailable. For example, in some instances, the EHCU 235 estimates the brake pressure of the vehicle 100 based on a change in speed of the vehicle 100 when acceleration data provided by the IMU 205 is not available. In other instances, the EHCU 235 estimates the brake pressure based on the longitudinal acceleration of the vehicle 100 that is determined by the IMU 205. In such instances, the magnitude of the longitudinal acceleration of the vehicle 100 is greater than a natural deceleration of the vehicle 100.

In some instances, the EHCU 235 determines the total mass of the vehicle 100 based on the relationship between the braking pressure applied to the vehicle 100, the longitudinal acceleration of the vehicle 100, and the total mass of the vehicle 100. For example, the EHCU 235 uses Equation 2 to determine the total mass of the vehicle, where "$F_b$" is a force indicative of the braking pressure of the vehicle 100, "a" is the longitudinal acceleration, or deceleration, of the vehicle 100, and "m" is the total mass of the vehicle 100.

$$m = F_b/a \qquad \text{[Equation 2]}$$

In some instances, the EHCU 235 determines the total mass of the vehicle 100 by comparing the received acceleration and braking pressure data to empirical calibration data stored in the memory 255 of the EHCU 235. For example, in some instances, empirical calibration data indicative of the respective relationships between the longitudinal acceleration of the vehicle 100, the braking pressure the vehicle 100, and the total mass of the vehicle 100 for a plurality of loading conditions of the vehicle 100 is stored in the memory 255. Accordingly, in such instances, the EHCU 235 determines that the total mass of the vehicle 100 is equal to the respective mass value that is stored in memory 255 in association with the current longitudinal acceleration and braking pressure of the vehicle 100. In some instances, the empirical calibration data is stored in memory 255 in the form of a look-up table.

Figure 5:
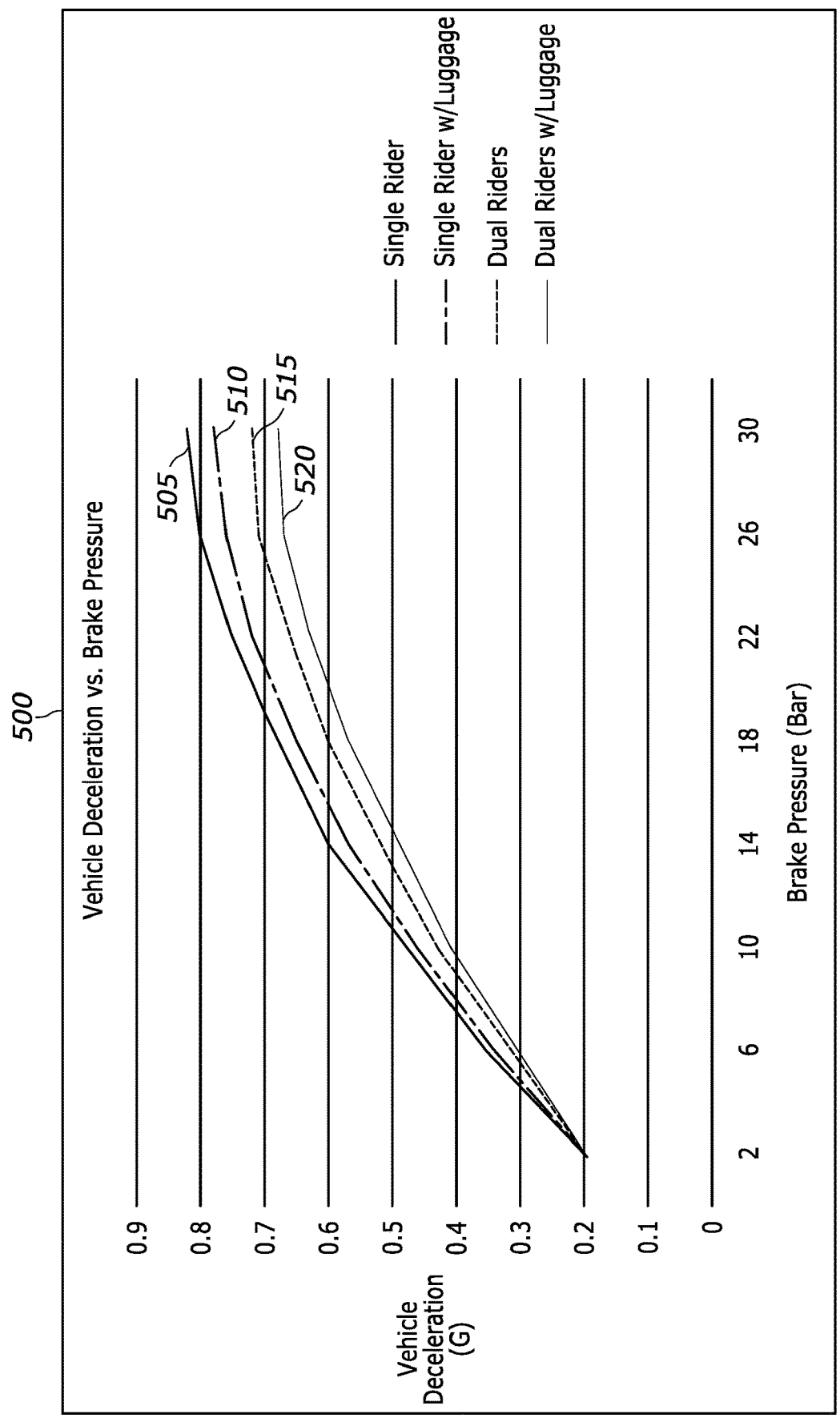
FIG. 5 is a graph illustrating the relationship between acceleration of the vehicle and braking pressure applied to the vehicle for a variety of vehicle loading conditions, according to one example.

In some instances, the empirical calibration data is stored in memory 255 in the form of curves, or graphs, that represent the relationship between the longitudinal acceleration of the vehicle 100 and the braking pressure applied to the vehicle 100 for a particular loading condition of the vehicle 100. FIG. 5 is graph 500 illustrating the relationship between the longitudinal acceleration, or deceleration, of the vehicle 100 and the braking pressured applied to the vehicle 100 for a variety of vehicle loading conditions. For example, the graph 500 includes a first curve 505 that represents the relationship between deceleration and braking pressure for a single rider loading condition, a second curve 510 that represents the relationship between deceleration and braking pressure for a single rider with luggage loading condition, a third curve 515 that represents the relationship between deceleration and braking pressure for a double rider loading condition, and a fourth curve 520 that represents the relationship between deceleration and braking pressure for a double rider with luggage loading condition. In some instances, the EHCU 235 uses the graph 500 in combination with the current longitudinal deceleration and braking pressure of the vehicle 100 to determine a total mass of the vehicle 100.

As described above, the EHCU 235 is configured to control one or more safety functions of the vehicle 100 based on the third total mass of the vehicle 100 that is determined using the second method. For example, the EHCU 235 controls safety functions such as braking, anti-lock brake control, traction control, yaw stability control, rear wheel lift management, front wheel lift management, and others, based on the third total mass of the vehicle 100.

As described above, in some instances, the EHCU 235 determines which method for determining the total mass of the vehicle 100 based on the data that is available to the EHCU 235. For example, the EHCU 235 may use the first method when the vehicle 100 is stationary and a loading condition of the vehicle 100 is detected. Similarly, the EHCU 235 may use the second method when the vehicle 100 is accelerating and/or use the third method when the vehicle 100 is braking. In some instances, the EHCU 235 uses each of the three methods for determining the total mass of the vehicle 100. In such instances, the EHCU 235 determines that the total mass of the vehicle 100 is equal to an average of the first total mass of the vehicle 100, the second total mass of the vehicle 100, and the third total mass of the vehicle 100. In some instances, the EHCU 235 stores the determined total mass of the vehicle 100 as a total mass global variable in the memory 255. In such instances, the EHCU 235 uses the total mass global variable when performing one or more safety and/or control functions such as braking, anti-lock brake control, traction control, yaw stability control, rear wheel lift management, front wheel lift management, and others.

Figure 6:
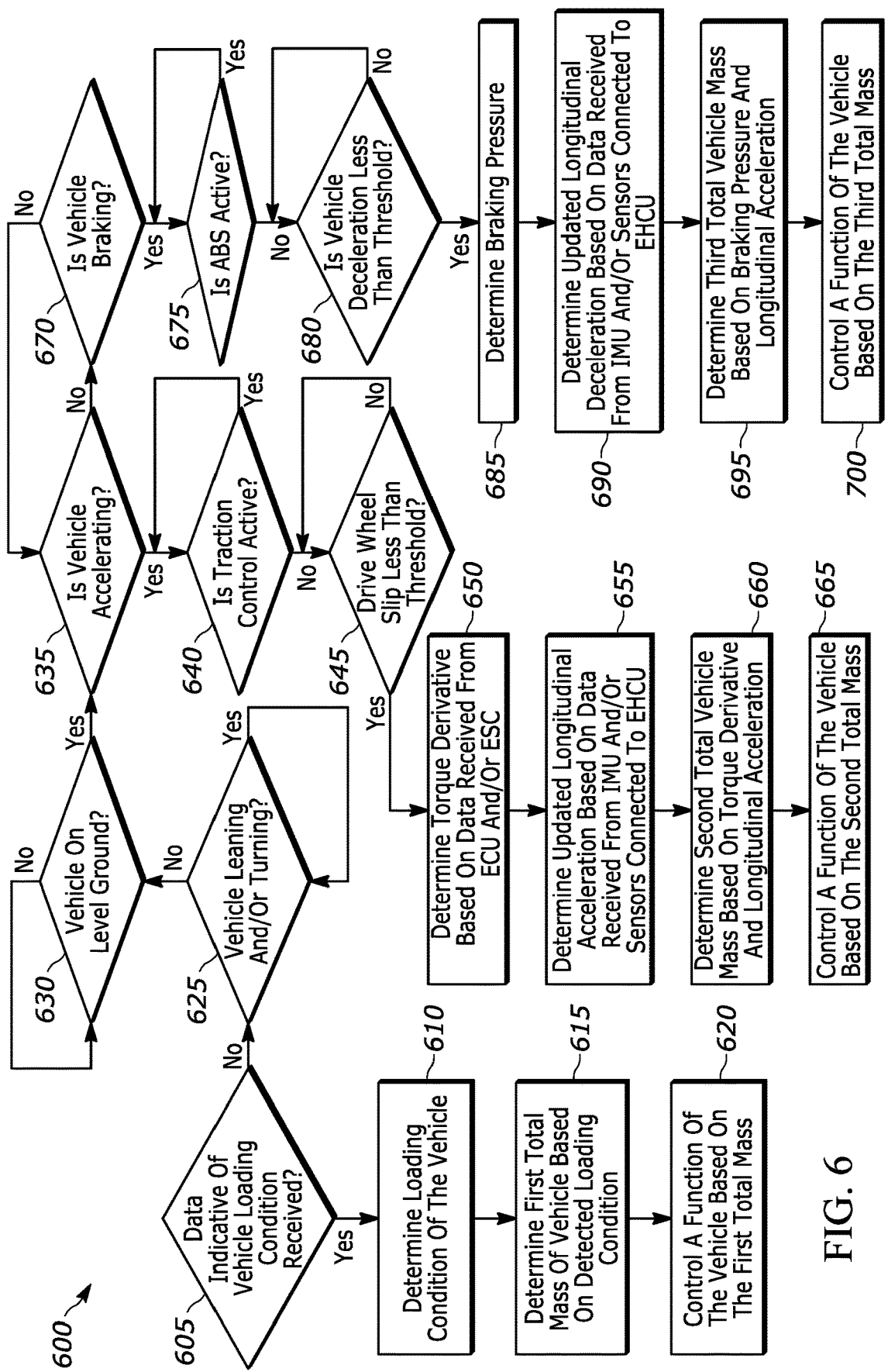
FIG. 6 is a block diagram of a method for determining the total mass of a vehicle, according to one example.

FIG. 6 illustrates an example method 600 of determining the total mass of the vehicle 100. The method 600 is described as being executed in part by the EHCU 235. However, in some instances, some aspects of the method 600 are performed by the electronic processor 250 included in the EHCU 235 and/or the memory 255 included in the EHCU 235. Likewise, in some instances, some aspects of the method 600 are performed by the IMU 205, the SDCU 210, the ECU 215, the ESC 220, the BCU 225, the user interface 230, and/or some other component included in the control system 200.

At block 605, the EHCU 235 determines whether data indicative of a loading condition of the vehicle 100 has been received from the SDCU 210 and/or the user interface 230. For example, in some instances, data indicative of a loading condition of the vehicle 100 includes signals generated by sensors included in and/or connected to the SDCU 210. As another example, in some instances, data indicative of a loading condition of the vehicle includes a user selection of a vehicle loading condition that was provided to the user interface 230. When the EHCU 235 determines that data indicative of the loading condition of the vehicle 100 has been received, the EHCU 235 determines the loading condition of the vehicle 100 (block 610). For example, the EHCU 235 determines that the loading condition of the vehicle 100 is one of a single rider loading condition, a single rider with luggage loading condition, a double rider loading condition, a double rider with luggage loading condition, or some other loading condition based on the data received from SDCU 210 and/or the user interface 230.

At block 615, the EHCU 235 determines a first total mass of the vehicle 100 based on the current loading condition of the vehicle 100. In some instances, the EHCU 235 determines that the first total mass of the vehicle 100 is equal to the mass value stored in the memory 255 in association with the current loading condition of the vehicle. As an example, the EHCU 235 determines that the first total mass of the vehicle 100 is equal to a first value stored in the memory 255 when the current loading condition of the vehicle 100 is a first loading condition, such as a single rider loading condition. As another example, the EHCU 235 determines that the first total mass of the vehicle 100 is equal to a second value stored in the memory 255 when the current loading condition of the vehicle 100 is a second loading condition, such as a single rider with luggage loading condition. At block 620, the EHCU 235 controls a function of the vehicle 100 based on the first total mass of the vehicle 100. For example, the function of the vehicle 100 may be a safety function such as braking, anti-lock brake control, traction control, yaw stability control, rear wheel lift management, front wheel lift management.

When the EHCU 235 determines that data indicative of the loading condition of the vehicle 100 has not been received at block 605, the method 600 proceeds to block 625. At block 625, the EHCU 235 determines whether the vehicle 100 is leaning and/or turning. When the EHCU 235 determines that the vehicle 100 is leaning and/or turning, the method 600 returns to block 625. When the EHCU 235 determines that the vehicle 100 is not leaning and/or turning, the method 600 proceeds to block 630.

For instances in which the vehicle 100 is a two-wheeled vehicle, the EHCU 235 determines whether vehicle 100 is leaning and/or turning based on data indicative of the orientation of the vehicle 100 received from the IMU 205. For example, in such instances, the EHCU 235 determines whether the vehicle 100 is leaning based on a body angle and/or angular rate (e.g., the roll rate, the yaw rate, the pitch angle, the pitch rate, etc.) sensed by the accelerometer(s) and/or the gyroscope(s) included in the IMU 205. When the sensed body angle and/or angular rate of the vehicle 100 exceeds a leaning threshold (e.g., 5%), the EHCU 235 determines that the vehicle 100 is leaning.

For instances in which the vehicle 100 is a three-wheeled vehicle, the EHCU 235 determines whether the vehicle is turning based on signals received from the steering angle sensor included in the BCU 225. For example, in such instances, the EHCU 235 determines whether the vehicle 100 is turning based on a steering angle of the vehicle 100 sensed by steering angle sensor included in the BCU 225. When the sensed steering angle of the vehicle 100 exceeds a steering angle threshold (e.g., 5 degrees), the EHCU 235 determines that vehicle 100 is turning.

At block 630, the EHCU 235 determines whether the vehicle 100 is positioned on level ground. In some instances, the EHCU 235 determines whether the vehicle 100 is positioned on level ground based on data received from the IMU 205 and/or the SDCU 210. For example, the EHCU 235 determines whether the vehicle 100 is level ground based on an inclination angle sensed by the accelerometer(s) and/or gyroscope(s) included in the IMU 205 and/or the road surface sensors included in the SDCU 210. When the sensed inclination angle of vehicle 100 exceeds a leaning threshold (e.g., 5%), the EHCU 235 determines that the vehicle 100 is not positioned on level ground and the method 600 returns to block 630. When the sensed inclination angle of vehicle 100 is less than the leaning threshold (e.g., 5%), the EHCU 235 determines that the vehicle 100 is positioned on level ground and the method 600 proceeds to block 635.

In some instances, blocks 625 and 630 of the method 600 are combined into a single step. That is, in some instances, the EHCU 235 determines whether the vehicle 100 is turning and/or leaning and whether the vehicle 100 is on level ground in single step.

At block 635, the EHCU 235 determines whether the vehicle 100 is accelerating. More particularly, in some instances, the EHCU 235 determines whether the longitudinal acceleration of the vehicle 100 is greater than zero at block 635. As described above, the EHCU 235 determines an acceleration of the vehicle 100 based on signals generated by the accelerometer(s) included in the IMU 205 and/or signals generated by an accelerometer included in the EHCU 235. When the EHCU 235 determines that the acceleration of the vehicle 100 is greater than zero based on signals provided by the IMU 205 and/or EHCU 235, the method proceeds to block 640.

At block 640, the EHCU 235 determines whether traction control is actively being applied to the vehicle 100. For example, the EHCU 235 activates traction control for the vehicle 100 to help maintain traction between the tires of the vehicle 100 and the road surface during slippery and/or dangerous driving conditions. The EHCU 235 does not activate traction control during normal and/or safe driving conditions. When the EHCU 235 determines that traction control is active, the method 600 returns to block 640. When the EHCU 235 determines that traction control is not active, the method proceeds to block 645.

At block 645, the EHCU 235 determines whether the slip of the rear, or drive, wheel 110 of the vehicle 100 is less than a slip threshold (e.g., a 5% slip threshold). In some instances, the front wheel 105 is the drive wheel instead of the rear wheel 110. The value of the slip threshold is a calibratable parameter that is modified based on factors such as vehicle type, suspension, tire design, and steady state wheel slip. In some instances, the EHCU 235 determines whether the slip of the drive wheel 110 is less than a slip threshold by comparing a detected speed (e.g., rotation speed) of the drive wheel 110 to a determined speed of the vehicle 100. In such instances, the EHCU 235 determines the slip of drive wheel 110 based on the difference between the speed of the drive wheel 110 and the speed of the vehicle 100. When the EHCU 235 determines that the slip of the drive wheel 110 is greater than the slip threshold, the method 600 returns to block 640. When the EHCU 235 determines that the slip of the drive wheel 110 is less than the slip threshold, the method 600 proceeds to block 650.

At block 650, the EHCU 235 determines the torque output of the vehicle 100 and/or one or more derivatives of the torque output of the vehicle 100. As described above with respect the second method for determining a total mass of the vehicle 100, the EHCU 235 determines the torque output and/or torque derivative(s) of the vehicle 100 based on signals received from the ECU 215 and/or the ESC 220. At block 655, the EHCU 235 determines an updated value of the longitudinal acceleration of the vehicle 100. As described above, the EHCU 235 determines an acceleration of the vehicle 100 based on signals generated by the accelerometer(s) included in the IMU 205 and/or signals generated by an accelerometer included in the EHCU 235.

At block 660, the EHCU 235 determines a second total mass of the vehicle 100 based on the torque output of the vehicle 100 and the updated longitudinal acceleration of the vehicle 100. As described above with respect to the second method for determining the total mass of the vehicle 100, in some instances, the EHCU 235 uses Equation 1 to determine the second total mass of the vehicle 100. For example, in such instances, the EHCU 235 determines the second total mass of the vehicle 100 based on the relationship between the vehicle's 100 output torque, the vehicle's 100 acceleration, and the total mass of the vehicle 100. In other instances, as described above, the EHCU 235 determines the second total mass of the vehicle 100 by comparing the vehicle's acceleration and torque output data to empirical calibration data stored in the memory 255 of the EHCU 235. At block 665, the EHCU 235 controls a function of the vehicle 100 based on the second total mass of the vehicle 100. For example, the function of the vehicle 100 may be a safety function such as braking, anti-lock brake control, traction control, yaw stability control, rear wheel lift management, front wheel lift management.

When the EHCU 235 determines that the acceleration of the vehicle 100 is not greater than zero (e.g., the value of the vehicle's acceleration is negative or zero) based on signals provided by the IMU 205 and/or EHCU 235, the method proceeds from block 635 to block 670. At block 670, the EHCU 235 determines whether the vehicle 100 is braking based on one or more of the pressure of the master cylinder, signals generated by the brake pressure sensor(s) 245 and/or an estimated brake pressure of the vehicle 100. For example, the EHCU 235 determines the vehicle 100 is braking when one or more of the pressure of the master cylinder, the pressure sensed by the brake pressure sensor(s) 245, and/or the estimated brake pressure of the vehicle 100 exceeds a threshold value. When the EHCU 235 determines that the vehicle 100 is not braking, the method returns to block 635. When the EHCU 235 determines that the vehicle 100 is braking, the method proceeds to block 675.

At block 675, the EHCU 235 determines whether the anti-lock braking system (ABS) of the vehicle 100 is active. When the EHCU 235 determines that ABS is active, the method 600 returns to block 675. When the EHCU 235 determines that ABS is not active, the method proceeds to block 680.

At block 680, the EHCU 235 determines whether the magnitude of the deceleration of the vehicle 100 is less than a deceleration threshold (e.g., 0.5 G, where G is the acceleration of gravity). The value of the deceleration threshold is a calibratable parameter that is modified based on factors such as vehicle type, suspension, tire design, and steady state wheel slip. As described above, the EHCU 235 determines the deceleration (e.g., negative acceleration) of the vehicle 100 based on signals generated by the accelerometer(s) included in the IMU 205 and/or the accelerometer included in the EHCU 235. When the EHCU 235 determines that the magnitude of the deceleration of the vehicle 100 is greater than the deceleration threshold, the method 600 returns to block 680. When the EHCU 235 determines that the magnitude of the deceleration of the vehicle 100 is less than the deceleration threshold, the method 600 proceeds to block 685.

At block 685, the EHCU 235 determines the braking pressure applied to the vehicle 100. As described above with respect the third method for determining a total mass of the vehicle 100, in some instances, the EHCU 235 determines the braking pressure of the vehicle 100 based on signals received from the pressure sensor(s) 245. In other instances, the EHCU 235 estimates a braking pressure applied to the vehicle 100. At block 690, the EHCU 235 determines an updated value of the longitudinal deceleration of the vehicle 100.

At block 695, the EHCU 235 determines a third total mass of the vehicle 100 based on the braking pressure applied to the vehicle 100 and the updated longitudinal deceleration of the vehicle 100. As described above with respect to the third method for determining the total mass of the vehicle 100, in some instances, the EHCU 235 uses Equation 2 to determine the third total mass of the vehicle 100. For example, in such instances, the EHCU 235 determines the third total mass of the vehicle 100 based on the relationship between the vehicle's 100 braking pressure, the vehicle's 100 acceleration, and the total mass of the vehicle 100. In other instances, as described above, the EHCU 235 determines the third total mass of the vehicle 100 by comparing the vehicle's deceleration and braking pressure data to empirical calibration data stored in the memory 255 of the EHCU 235. At block 700, the EHCU 235 controls a function of the vehicle 100 based on the third total mass of the vehicle 100. For example, the function of the vehicle 100 may be a safety function such as braking, anti-lock brake control, traction control, yaw stability control, rear wheel lift management, front wheel lift management In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

I claim:

1. A control system for a vehicle comprising:
   a first sensor configured to sense an acceleration of the vehicle;
   a second sensor configured to sense a torque output of the vehicle; and
   an electronic processor connected to the first and second sensors, the electronic processor configured to:
      determine whether a loading condition of the vehicle is detected;
      determine a first total mass of the vehicle based on the loading condition of the vehicle when the loading condition of the vehicle is detected;
      control a function of the vehicle based on the first total mass of the vehicle when the loading condition of the vehicle is detected;
      receive a first signal indicative of the acceleration of the vehicle from the first sensor;
      receive a second signal indicative of the torque output of the vehicle from the second sensor;
      determine a second total mass of the vehicle based on the acceleration of the vehicle and torque output of the vehicle; and
      control the function of the vehicle based on the second total mass of the vehicle when the loading condition of the vehicle is not detected.

2. The control system of claim 1, wherein the electronic processor is further configured to determine the second total mass of the vehicle based on the acceleration of the vehicle and the torque output of the vehicle when the acceleration of the vehicle is greater than zero.

3. The control system of claim 1, further comprising a memory configured to store a plurality of values of the first total mass of the vehicle associated with a plurality of loading conditions of the vehicle;
   wherein the electronic processor is further configured to determine the first total mass of the vehicle is a first value stored in the memory when the loading condition of the vehicle is detected to be a first loading condition; and
   wherein the electronic processor is further configured to determine the first total mass of the vehicle is a second value stored in the memory when the loading condition of the vehicle is detected to be a second loading condition.

4. The control system of claim 1, further comprising a user interface configured to receive a user selection for the loading condition of the vehicle; and
   wherein the electronic processor is further configured to detect the loading condition of the vehicle based on the user selection provided to the user interface.

5. The control system of claim 4, wherein the loading condition of the vehicle is one selected from the group consisting of a single rider loading condition, a single rider with luggage loading condition, a double rider loading condition, and a double rider with luggage loading condition.

6. The control system of claim 1, further comprising a third sensor configured to sense a braking pressure applied to the vehicle.

7. The control system of claim 6, wherein the electronic processor is further configured to:
   determine whether the acceleration of the vehicle is greater than zero;
   determine whether the vehicle is braking when the acceleration of the vehicle is not greater than zero;
   receive a third signal indicative of a braking pressure applied to the vehicle from the third sensor; and
   determine a third total mass of the vehicle based on the braking pressure applied to the vehicle and the acceleration of the vehicle when the acceleration of the vehicle is not greater than zero;
   control the function of the vehicle based on the third total mass of the vehicle.

8. The control system of claim 1, wherein the function of the vehicle is a safety function selected from the group consisting of anti-lock brake control, traction control, yaw stability control, rear wheel lift management, and front wheel lift management.

9. The control system of claim 1, wherein the electronic processor is included in an electro-hydraulic control unit included in the vehicle;
   wherein the first sensor is included in an inertial measurement unit of the vehicle; and
   wherein the second sensor is included in an engine control unit included in the vehicle.

10. A method for determining a total mass of a vehicle, the vehicle including a first sensor configured to sense an acceleration of the vehicle, a second sensor configured to sense a torque output of the vehicle, and an electronic processor connected to the first and second sensors, the method comprising:
   determining, via the electronic processor, whether a loading condition of the vehicle is detected;
   determining, via the electronic processor, a first total mass of the vehicle based on the loading condition of the vehicle when the loading condition of the vehicle is detected;

controlling a function of the vehicle based on the first total mass of the vehicle when the loading condition of the vehicle is detected;

receiving, via the electronic processor, a first signal indicative of the acceleration of the vehicle from the first sensor;

receiving, via the electronic processor, a second signal indicative of the torque output of the vehicle from the second sensor;

determining, via the electronic processor, a second total mass of the vehicle based on the acceleration of the vehicle and torque output of the vehicle; and controlling, via the electronic processor, the function of the vehicle based on the second total mass of the vehicle when the loading condition of the vehicle is not detected.

11. The method of claim 10, further comprising determining, via the electronic processor, the second total mass of the vehicle based on the acceleration of the vehicle and the torque output of the vehicle when the acceleration of the vehicle is greater than zero.

12. The method of claim 10, further comprising determining, via the electronic processor, the first total mass of the vehicle is a first value stored in a memory when the loading condition of the vehicle is detected to be a first loading condition; and determining, via the electronic processor, the first total mass of the vehicle is a second value stored in the memory when the loading condition of the vehicle is detected to be a second loading condition.

13. The method of claim 10, further comprising receiving, via a user interface, a user selection for the loading condition of the vehicle; and determining, via the electronic processor, the loading condition of the vehicle based on the user selection provided to the user interface.

14. The method of claim 13, wherein the loading condition of the vehicle is one selected from the group consisting of a single rider loading condition, a single rider with luggage loading condition, a double rider loading condition, and a double rider with luggage loading condition.

15. The method of claim 10, further comprising:
determining, via the electronic processor, whether the acceleration of the vehicle is greater than zero;
determining, via the electronic processor, whether the vehicle is braking when the acceleration of the vehicle is not greater than zero;
receiving, via the electronic processor, a third signal indicative of a braking pressure applied to the vehicle from a third sensor;
determining, via the electronic processor, a third total mass of the vehicle based on the braking pressure applied to the vehicle and the acceleration of the vehicle when the acceleration of the vehicle is not greater than zero; and controlling, via the electronic processor, the function of the vehicle based on the third total mass of the vehicle.

16. The method of claim 10, wherein the function of the vehicle is a safety function selected from the group consisting of anti-lock brake control, traction control, yaw stability control, rear wheel lift management, and front wheel lift management.

17. The method of claim 10, wherein the electronic processor is included in an electro-hydraulic control unit included in the vehicle;
wherein the first sensor is included in an inertial measurement unit of the vehicle; and
wherein the second sensor is included in an engine control unit included in the vehicle.

18. A control system for a vehicle comprising:
a first sensor configured to sense an acceleration of the vehicle;
an electronic processor connected to the first sensor, the electronic processor configured to:
determine whether a loading condition of the vehicle is detected;
determine a first total mass of the vehicle using a first technique when the loading condition of the vehicle is detected;
receive a first signal indicative of the acceleration of the vehicle from the first sensor;
determine whether the acceleration of the vehicle is greater than zero;
determine a second total mass of the vehicle using a second technique when the acceleration of the vehicle is greater than zero; and
determine a third total mass of the vehicle using a third technique when the acceleration of the vehicle is not greater than zero; and
control a function of the vehicle based on one of the first total mass of the vehicle, the second total mass of the vehicle, and the third total mass of the vehicle.

19. The control system of claim 18, wherein the loading condition of the vehicle is one selected from the group consisting of a single rider loading condition, a single rider with luggage loading condition, a double rider loading condition, and a double rider with luggage loading condition.

20. The control system of claim 18, wherein the first technique for determining the total mass of the vehicle is based on the loading condition of the vehicle;
wherein the second technique for determining the total mass of the vehicle is based on a torque output of the vehicle; and
wherein the third technique for determining the total mass of the vehicle is based on a braking pressure applied to the vehicle.

* * * * *